United States Patent [19]
Barton et al.

[11] Patent Number: 5,705,821
[45] Date of Patent: Jan. 6, 1998

[54] SCANNING FLUORESCENT MICROTHERMAL IMAGING APPARATUS AND METHOD

[75] Inventors: Daniel L. Barton; Paiboon Tangyunyong, both of Albuquerque, N. Mex.

[73] Assignee: Sandia Corporation

[21] Appl. No.: 743,787

[22] Filed: Nov. 7, 1996

[51] Int. Cl.$^6$ .................................................. F21V 9/16
[52] U.S. Cl. ........................... 250/458.1; 250/459.1; 250/461.1
[58] Field of Search ............... 250/458.1, 459.1, 250/461.1, 334; 374/161

[56] References Cited

U.S. PATENT DOCUMENTS

| | | | |
|---|---|---|---|
| 4,455,741 | 6/1984 | Kolodner | 356/43 |
| 4,819,658 | 4/1989 | Kolodner | 128/736 |
| 5,149,972 | 9/1992 | Fye et al. | 250/461.1 |
| 5,272,330 | 12/1993 | Betzig et al. | 250/216 |
| 5,286,971 | 2/1994 | Betzig et al. | 250/227.26 |
| 5,288,997 | 2/1994 | Betzig et al. | 250/227.26 |
| 5,288,998 | 2/1994 | Betzig et al. | 250/227.26 |
| 5,288,999 | 2/1994 | Betzig et al. | 250/227.26 |
| 5,304,809 | 4/1994 | Wickersheim | 250/458.1 |

OTHER PUBLICATIONS

Daniel L. Barton, "Fluorescent Microthermographic Imaging, " Proceedings of the 20th ISTFA, pp. 87–95, (1994).
Paibon Tangyunyong and Daniel L. Barton, "Photon Statistics, Film Preparation and Characteristics in Fluorescent Microthermal Imaging," Proceedings of the ISTFA, 1995.
Paul Kolodner and J. Anthony Tyson, "Remote Thermal Imaging with 0.7μm Spatial Resolution Using Temperature–Dependent Fluorescent Thin Films," Appl. Phys. Lett. 42 (1), pp. 117–119, (1 Jan. 1983).
Paul Kolodner and J. Anthony Tyson, "Microscopic Fluorescent Imaging of Surfaces Temperature Profiles With 0.01 °C Resolution," Appl. Phys. Lett. 40 (9), pp. 782–784, (1 May 92).
Barnes Infrared Radiometric Microscope Model RM–2A Instruction Manual (Barnes Engineering Co., Stamford, CT) undated.
Barnes Infrared Micro Imager Model RM–50 (Barnes Engineering Co., Stamford, CT) undated.
C. T. Elliot, D. Day, and D. J. Wilson, "An Integrating Detector for Serial Scan Thermal Imaging," Infrared Physics, vol. 22, pp. 31–42 (1982).
D. Pote, G. Thome, and T. Guthrie, "An Overview of Infrared Thermal Imaging Techniques in the Reliabilty and Failure Analysis fo Power Transistors," Proceddings of the International Society for Testing and Failure Analysis (ISTFA), pp. 63–75 (1988).
G. J. Zissis, "Infrared Technology Fundamentals," Optical Engineering, vol. 15, No. 6, pp. 484–497 (1976).
J. Hiatt, "A Method fo Detecting Hot Spots on Semiconductors Using Liquid Crystals," Proceedings of the International Reliability Physics Symposium (IRPS), pp. 130–133 (1981).
A. Geol and A. Gray, "Liquid Crystal Technique as a Failure Analysis Tool," Proceedings of the International Reliabilty Physics Symposium (IRPS), p. 115 (1980).
H. Winston, O.J. Marsh, C.K. Suzuki, and C. I. Telk, "Fluorescence of Europium Thenoyltrifluoroacetonate, I. Evaluation of Laser Threshold Parameters," Journal of Chemical Physics, vol. 39, pp. 267–270 (15 Jul. 1963).

(List continued on next page.)

Primary Examiner—Don Wong

[57] ABSTRACT

A scanning fluorescent microthermal imaging (FMI) apparatus and method is disclosed, useful for integrated circuit (IC) failure analysis, that uses a scanned and focused beam from a laser to excite a thin fluorescent film disposed over the surface of the IC. By collecting fluorescent radiation from the film, and performing point-by-point data collection with a single-point photodetector, a thermal map of the IC is formed to measure any localized heating associated with defects in the IC.

29 Claims, 1 Drawing Sheet

OTHER PUBLICATIONS

M. Bhaumik, "Quenching and Temperature Dependence of Fluorescence in Rare-Earth Chelates," *Journal of Chemistry Physics*, vol. 40, pp. 3711–3715 (15 Jun. 1964).

G. Crosby, R. Whan, and R. Aliere, "Intramolecular Energy Transfer in Rare Earth Chelates: Role of the Triplet State, "*Journal of Chemical Physics*, vol. 34, pp. 743–748 (Mar. 1961).

E. J. Bowen and J. Sahu, "The Effect of Temperature on Fluorescence of Solutions," *Journal of Physical Chemistry*, vol. 63, pp. 4–7 (1959).

SCANNING FLUORESCENT MICROTHERMAL IMAGING APPARATUS AND METHOD

GOVERNMENT RIGHTS

The Government has rights to this invention pursuant to Contract No. DE-AC04-94AL85000 awarded by the U.S. Department of Energy.

BACKGROUND OF THE INVENTION

1. Field of the Invention (Technical Field):

This invention relates to integrated circuit failure analysis methods and apparatuses.

2. Background Art:

Various fluorescence-based techniques for analyzing/testing substrates are known and used. U.S. Pat. No. 5,149,972 to Fay et al., teaches a video imaging system comprising a fluorescent imaging microscope and a ultraviolet (UV) radiation source and a method of characterizing biological cells by detection of a fluorescence signal which is related to a specific sample property: an arc lamp and filter wheel system provide the fluorescence pump source. Also, U.S. Pat. Nos. 5,272,330, 5,288,971, 5,288,997, 5,288,998, 5,288,999, all to Betzig et at., teach the use of a scanning near-field optical microscope (SNOM) system with a laser light source which is used to inspect (measure) integrated circuits and to perform fluorescent imaging applications on biological substrates.

Fluorescence based techniques are also known to produce high spatial and thermal resolution images of microelectronic devices. When design rules and feature sizes were large enough that sub-micron spatial resolution was not needed, infrared (IR) thermal techniques were available that calculated the object's temperature from infrared emission. *Barnes Infrared Radiometric Microscope Model PM-2A Instruction Manual; Barnes Infrared Micro Imager Model PM-50 Instruction Manual*; C. T. Elliott, D. Day, and D. J. Wilson, "An Integrating Detector for Serial Scan Thermal Imaging, " *Infrared Physics*, Vol. 22, pp. 31–42 (1982); D. Pote, G. Thome, and T. Guthrie, "An Overview of Infrared Thermal Imaging Techniques in the Reliability and Failure Analysis of Power Transistors," *Proceedings of ISTFA*, pp. 63–75 (1988); G. J. Zissis "Infrared Technology Fundamentals," *Optical Engineering*, Vol. 15, no. 6, pp. 484–497 (1976); P. Burgraaf, "IR Imaging: Microscopy and Thermography", *Semiconductor International*, pp. 58–65 (1986).

As integrated circuit feature sizes began to shrink toward 1 µm, the limitations imposed by IR thermal systems became more pronounced. Liquid crystals were used to overcome these limitations, but they lacked the temperature measurement capabilities of other techniques. Liquid crystals provide only a binary response, indicating whether or not the hot area is above the crystal's transition temperature. J. Hiatt, "A Method of Detecting Hot Spots on Semiconductors Using Liquid Crystals," *Proceedings of IRPS*, pp. 130–133 (1981); G. D. Dixon. "Cholesteric Liquid Crystals in Non-Destructive Testing," *Materials Evaluation*, pp. 51–55 (1977); A. Geol and A. Gray, "Liquid Crystal Technique as a Failure Analysis Tool," *Proceedings of IRPS*, p. 115 (1980).

The spatial resolution requirement became more important as feature sizes in modern integrated circuits continue to decrease well below the 1 µm level. Fluorescent microthermographic imaging (FMI) was developed to meet the need for sub-micron imaging. FMI is a thermal imaging technique based on the concept of using film with a temperature-dependent fluorescence quantum yield, which is applied to the surface of a substrate (e.g., an integrated circuit) to generate high resolution thermal maps of integrated circuits. P. Kolodner and J. A. Tyson, "Microscopic fluorescent imaging of surface temperature profiles with 0.01° C. resolution," *Appl. Phys. Lett.*, 40, 782 (1982); P. Kolodner and J. A. Tyson, "Remote thermal imaging with 0.7 mm spatial resolution using temperature dependent fluorescent thin films," Appl. Phys. Lett. 42, 117(1983); U.S. Pat. Nos. 4,819,658 and 4,455,741 to P. Kolodner.

FMI is a powerful and valuable tool for analysis of microelectronics systems, which offers the ability to create thermal maps of surfaces, e.g., integrated circuits, with a thermal resolution theoretically limited to 0.001° C., and a spatial resolution which is diffraction-limited to 0.3 µm. While the temperature resolution is comparable to that available on IR systems, the spatial resolution is much better. The FMI technique provides better spatial resolution by imaging a temperature-dependent fluorescence at 612 nm instead of the 1.5 µm to 12 µm emission range used by IR techniques.

The FMI technique involves coating a sample surface with a fluorescent rare-earth-based thin film (e.g., europium thenoyltrifluoroacetonate also referred to as EuTTA) that, upon exposure to UV light, emits temperature-dependent fluorescence. Earlier laser research investigated the use of rare earth chelates as sources for liquid lasers. Rare earth chelates were identified as possible sources because of their well known fluorescence responses to UV or near-UV excitation sources. H. Winston, O. J. Marsh, C. K. Suzuki, and C. L. Telk, "Fluorescence of Europium Thenoyltrifluoroacetonate: I. Evaluation of Laser Threshold Parameters," *J. Chem. Phys.*, Vol. 39, no. 2, pp. 267–270 (July, 1963); M. Bhaumik, "Quenching and Temperature Dependence of Fluorescence in Rare-Earth Chelates," *J. Chem. Phys.*, Vol. 40, 3711, (1964); G. Crosby, R. Whan, and R. Alire, "Intramolecular Energy Transfer in Rare Earth Chelates: Role of the Triplet State," *J. Chem. Phys.*, Vol. 34, 743, (1961); E. Bowen and J. Sahu, "The Effect of Temperature on fluorescence of Solutions," *J. Phys. Chem*, Vol. 63, 4 (1959).

Although EuTTA is not the only compound available for FMI, since there are chelates of all of the rare earth elements which include La, Sm, Eu, Gd, Tb, Dy, Tm, Yb, and Lu, the europium system was ultimately selected as the most suitable because of its temperature characteristics, emission/absorption characteristics, availability, and other qualities. More specifically, europium thenoyltrifluoroacetonate (EuTTA) has the best fit for temperature-dependent fluorescence quantum yield in the temperature range near room temperature. Therefore, EuTTA, traditionally in suspension in a solid matrix, is the primary compound for FMI. The availability of compounds such as EuTTA is the main reason that the fundamental limitation on spatial resolution encountered in IR thermal systems could be overcome.

The FMI process is based on the temperature-dependent fluorescence quantum yield of the fluorescing EuTTA film. The TTA ligand absorbs energy at around 335 nm. For excitation wavelengths greater than about 360 nm, the amount of incident radiation that is absorbed falls off strongly, and there is substantial lack of absorption for wavelengths much above 500 nm. This allows for a strong separation between the excitation source and the fluorescence emission.

During FMI, UV radiation from a light source contacts the film on the substrate and excites the EuTTA fluorescence through an intermolecular energy transfer. The TTA ligand absorbs the UV light then transfers the energy to the europium ion. In the energy transfer, the most efficient transition generates a bright fluorescence line at 612 nm which is used for FMI. For image formation in thermal imaging applications, FMI relies upon changes in the emission spectra of the compound with temperature, i.e., the resulting fluorescence intensity or yield varies as the temperature of the substrate being tested varies; more specifically, in its present form, FMI relies on UV excitation to produce light emission by a fluorescing compound at 612 nm, thereby achieving a spatial resolution of approximately 0.3 μm.

Known FMI techniques require incorporating the EuTTA chelate into a PMMA (polymethylmethacrylate) matrix that typically consists of 1.2 wt. % EuTTA, 1.8 wt. % PMMA, and 97 wt. % MEK (methylethylketone). The MEK is a very high vapor pressure solvent that evaporates rapidly leaving the EuTFA/PMMA mixture as a thin film on the sample. Typically this mixture is spun onto the sample surface and allowed to cure in an oven at 125° C. for about 30 minutes. Ideally, the film should only be several optical absorption lengths thick. At an excitation wavelength of 365 nm, a 300-nm-thick film is approximately 3.5 optical absorption lengths thick. The concept is to have the film thick enough that most of the UV light is absorbed, but thin enough that the thermal profile of the sample surface is not distorted. The film should be as uniform as possible; however, the image processing required to create a thermal image reduces the influence of film non-uniformity on image quality.

The three essential system hardware components required for FMI include a light source, a camera system, and an optical platform. It is known that the light source used for fluorescence excitation may be an ultraviolet source in the approximate range of 210 nm to 365 nm. Sources with wavelengths much greater than about 365 nm require higher intensities to excite fluorescence and thus have not been used. However, UV sources always present a hazard to the human eye.

Traditional FMI systems typically use an arc lamp as the excitation source, most commonly mercury, xenon, and mercury/xenon types. However, stability of the light source is one of the limiting factors in creating high resolution thermal images; and the stability of the light output may be problematic when using arc lamps for fluorescent imaging applications.

Alternatively, a laser, either continuous wave (CW) or a pulsed system, may be used as a light source. Lasers differ from arc lamps in that all of their optical energy is in one narrow wavelength band rather than being spread over a continuum, and lasers are more efficient since all of the light output is within the wavelength range of interest. CW lasers have a continuous light emission; pulsed systems cannot sustain continuous emission and emit light in short pulses, usually with repetition rates up to several kilohertz.

Problems have been encountered in using either CW or pulsed laser systems. Cost is a major factor in choosing laser systems. Also, many of the CW systems that have a weak line suitable for FMI are very large and inefficient laser systems (e.g., argon ion lasers). It is therefore necessary to purchase a laser with an overall lasing output of up to several watts to yield several milliwatts for a particular UV line needed. Pulsed systems which are known for use in FMI, such as dye lasers or solid state lasers, can be relatively inexpensive, but for FMI, two successive exposures (one for the cold image and one for the hot image) may contain different numbers of pulses (i.e. total energy output) from the laser. This difficulty adds another process that may reduce the temperature resolution of the system. Dye lasers do have the ability to be tuned over a broad range of wavelengths giving them an advantage when and if other fluorescent compounds are developed.

For the camera system, existing FMI systems, without exception, have used slow-scan charge coupled device (CCD) cameras, where slow-scan refers to the frame rate at which data is read out of the CCD array. Various problems have been encountered in the available choices of cameras for FMI. In principle, any camera which can yield an image in digital format, either directly or by frame grabbing, can be used for FMI.

The use of a TV camera has the advantage of speed. When using TV cameras for low light situations, it is necessary to grab and add video frames together. TV rate cameras, when connected to high speed, integrating frame grabbers, could provide comparable images to slow scan cameras in a much shorter period of time. At a frame rate of thirty frames per second, several hundred frames could be added in less than a minute.

Television (TV) cameras adhere to the NTSC video standard where the CCD array in the TV camera would be read at a rate of 30 frames per second. While this frame rate is good for television cameras, for quantitative analysis of the image content it is relatively poor. High quality TV cameras can approach 400 lines of information in about 500 fields with about 8 bits of dynamic range.

As an example, if a camera with 16 bit gray scale resolution is used and assuming the published value of the logarithmic slope of $-0.047/°$ C., the best possible thermal resolution would be:

$$\delta T = (-0.047)^{-1} \ln\left(\frac{65534}{65535}\right) = 0.324 \times 10^{-3} °\text{ C.}$$

Comparing this with an 8 bit gray scale camera:

$$\delta T = (-0.047)^{-1} \ln\left(\frac{254}{255}\right) = 83.6 \times 10^{-3} °\text{ C.}$$

These calculations show that using a camera system with 8 bits of dynamic range would limit system sensitivity to roughly 0.4% change in quantum efficiency, or 1 part in 256.

In applications where FMI is needed but funds to build a system are limited, TV cameras may be useful; however, in contrast, slow-scan cameras are available with 12 to 16 bits of dynamic range and can thus handle image changes in intensity from 1 part in 4096 to 1 part in 65536 in an image of size ranging from 512 by 512 to 1024 by 1024 pixels. This translates into an order of magnitude increase in possible temperature resolution. In the past, the use of slow-scan CCD cameras has been the only means of insuring that the camera is not the limiting factor in system performance.

Noise in collected images is a second factor that limits temperature resolution. Slow-scan cameras are almost always either Peltier (i.e. thermo-electric) or liquid nitrogen-cooled. Cooling helps to eliminate thermal generation of electron-hole pairs which can fill up CCD charge wells with noise instead of image signal. Peltier, or liquid/peltier, cooled systems generally operate down to about $-39°$ C.; and, as a result, generate only several electrons/second of noise with a CCD charge well capacity of typically several hundred thousand electrons. Liquid nitrogen-cooled systems, by cooling to a much lower temperature, keep the noise down to several electrons for every ten to one hundred seconds. With these systems, the readout electronics also add a small, but predictable amount of noise to the image, typically several electrons or tens of electrons per pixel. The noise qualifies of these cameras and their integration capabilities, along with characteristics of spectral sensitivities past 1 micron, has prompted manufacturers of light emission systems to use them in lieu of TV cameras.

However, problems involved in choosing to use a slow scan CCD camera include, first, the time factor. Slow-scan cameras, since they do not adhere to TV standards, are designed to stare at a field of view and integrate for a variable length of time. For a situation where there is a very small amount of light being emitted, the camera can stare at the field of view for several minutes to several hours or until the detector becomes saturated. Photon statistics will determine the ultimate thermal resolution of FMI. In order to achieve a thermal resolution of 1 m° C., even with a 16 bit camera, multiple images will have to be added together to increase the signal to noise ratio. This process will add a significant amount of time when using a slow scan CCD camera as a single image takes several seconds to read into memory and store.

In the choice of the optical platform to house the excitation source and camera, probe stations have traditionally provided an obvious choice for an FMI system in order to electrically bias the sample. Most systems used for probing fine geometries have optics boxes that have TV camera ports. Problems encountered with optical platforms for FMI include the loss of some optical quality, since the lenses on these systems are extra-long working distance to allow for use during probing. Alternatively, standard metallographic microscopes may be used and generally have superior optical systems, but suffer from short working distance objectives and limited facilities for electrical biasing of the sample. Most microscopes do have C-mount camera ports or other ways of attaching a camera.

Other system requirements include a computer with image processing capabilities that can handle the requirements of the FMI process, the means for inputting the excitation source to the sample, and a filter. Although several standard computers are available for this use, and the requirements for the interference filters are not problematic, in known FMI systems, experience with the standard choice of input for the excitation source has not been completely satisfactory. Traditional FMI systems input the excitation source through a UV grade fiber optic cable onto the sample at an oblique angle, which limits the amount of light that can easily be sent to the sample, especially when using high magnification, shorter working distance lenses. Even on a probe station, a 50× lens will have a short enough working distance to complicate sample illumination. Also, while it has been found that the use of a "through-thelens" type of illumination removes the problems of sample illumination, it adds the problems encountered with non-UV transparent optics found in most microscopes. Generally, standard optical components offer transparency for light with wavelengths greater than about 370 nm. Further, although UV grade components are available, the components, such as lenses, tend to be very limited in application and type (e.g., magnification, working distance, numerical aperture, etc.).

In FMI operation, an image of the entire sample is made on a high resolution camera to obtain a picture of the sample with high spatial resolution. The total emission observed by the camera in a given time period with the sample at given temperatures is recorded, and the collected fluorescence information is mathematically converted to arrive at a quantum efficiency versus temperature relationship for the light intensity at a given point on the image. A "thermal picture" is created off-line by a computer program which normalizes this image to an image of the sample when "cold", i.e., when electrical stimulus or bias is not applied to the sample, in order to remove all optical features, leaving a purely thermal image of high resolution.

Image processing specifically involves generating a thermal image by either dividing an image taken without bias (cold image) by one taken under bias (hot image) or vice versa. The normalization procedure turns changes in quantum efficiency into changes in temperature; relative temperature changes at given locations are calculated using the quantum efficiency and light intensity of the cold and hot images (or hot and cold images), respectively, and a proportionality constant determined experimentally for the particular film composition. Then, the "hot" and "cold" images are digitally divided in order to remove spatial variations in the fluorescence intensity. The natural log of the quantum efficiency ratio versus temperature change (around room temperature) is plotted, and the slope of the linear fit is found. For temperature conversion, the natural log of the quantum efficiency relation is divided by the slope. The result is the relative temperature change of a given pixel location; in other words, the brightness of each pixel is proportional to the logarithm of the ratio of the brightness of that pixel in the cold image (or hot image) to the brightness of that pixel in the hot image (or cold image) and is thus proportional to the temperature difference at that point. A map of the ratio of quantum efficiencies between hot and cold images is thereby generated, in which the image brightness is proportional to the logarithm of the light intensity incident on the CCD.

Kolodner and Tyson (previously cited) taught the typical and best known system for FMI, as a fluorescence-based technique to measure surface temperature profiles on semiconductor devices using a UV arc lamp to obliquely illuminate a film that has a temperature dependent quantum efficiency, with a probe station and a slow-scan CCD camera mounted on the TV camera port to collect the fluorescence, and with the interference filter in front. The first CCD array was a 100×100 array, which was later upgraded to a camera with a 384×576 peltier-cooled array. Light from a 100 watt Hg arc lamp was sent through IR and blue-glass filters and a fiber optic cable to focus on the sample at an oblique angle. Image processing was performed on a PDP 11/73 type computer. This system achieved measurements of 0.01° C. thermal and 0.7 μm spatial resolution. The only systems known to be commercially marketed for FMI are virtually identical to this system, except for computer improvements.

All previously known methods for fluorescence analysis or FMI of ICs have continued to rely on an ultraviolet (UV) excitation source, more specifically a flood beam UV source in an oblique, under-the-lens illumination configuration, to stimulate the fluorescence to be collected into an image. In the flood-beam configuration, the entire sample surface is illuminated by the UV excitation source. The UV excitation source has been either an arc lamp (mercury, xenon, or mercury/xenon) or a UV laser source with its beam expanded to illuminate the whole field of view. The oblique flood-beam configuration requires that enough space exists between microscope objective and sample surface to allow for uniform illumination of the sample by the UV excitation source, and thus necessitates the use of a relatively long working distance microscope objective for image collection. Also, the flood-beam excitation configurations require that the fluorescent images be captured in a single frame by a cooled slow-scan CCD camera. This process, because of the minute signal differences that must be measured, necessitates the use of an expensive, slow-scan CCD camera designed for quantitative data analysis.

The long working distance limitation was overcome by another system which used coincident illumination (typically from mercury or mercury-xenon arc lamp output with excitation wavelengths ranging from 365 nm to about 400 nm) with standard microscope optics, although still in a flood beam configuration (D. L. Barton, "Fluorescent Microthermographic Imaging", *Proceedings of the 20th ISTFA*, pp. 87–95 (1994)). While the ability to pump the fluorescence at wavelengths which will pass through most microscope objectives solved many illumination problems, especially those involving field uniformity and use of FMI with high-magnification, short-working-distance objectives, these illumination sources, not being laser sources, were not suitable to create a "scanned" image; also none are conveniently available and/or cost-effective in the 365–390 nm range. Further, as with the earlier FMI process, this flood-beam excitation configuration still requires that the fluorescent images be captured in a single frame by an expensive, slow-scan CCD camera designed for quantitative data analysis, because of the minute signal differences that must be measured.

Problems, other than those connected with time consumption and expense, have arisen in connection with the use of this type of light source combined with the fluorescent film on the substrate; these problems negatively affect the results of the thermal imaging achieved by the process. Ultraviolet bleaching (film degradation or loss in fluorescent intensity) is an unavoidable problem in the FMI process as currently performed; this problem arises in connection with the film composition or its deposition on the sample in combination with the use of an ultraviolet excitation source.

Inorganic-based films such as EuTTA are known to gradually lose their ability to fluoresce under UV illumination leading to decreasing fluorescent intensity with increasing UV exposure time. Since the fluorescence intensity decreases as the film gets hotter and the film degrades under exposure to UV light, the sample will appear hotter after repeated imaging sequences. The decreased intensity affects the accuracy of the results, in that ideally, the fluorescent signals on the hot and cold images should be identical in areas where no temperature changes occur. With bleaching, this ideal condition is not possible, resulting in the generation of unwanted non-thermal signals. In the presence of other factors such as non uniformity of film thickness and UV illumination, these non-thermal signals are manifested as spatial artifacts.

Another problem that occurs in the performance of traditional FMI is a limited capacity to improve the signal-to-noise (S/N) ratio that is dependent on the total number of photons collected. In the absence of all other noise sources, the signal-to-noise ratio in high photon flux imaging applications is limited by photon shot noise. In order to obtain meaningful thermal information, it is crucial to separate the thermal signals from the photon shot noise. When current is run through a metal test structure during FMI, several peaks are formed in histograms of the thermal images; one peak is due to photon shot noise, and the remaining peaks are due to surface temperature variations of the test structure. These remaining peaks contain thermal information associated with the heating of the metal test structure, and become more pronounced as the current in the test structure is increased. The peak due to photon shot noise shifts in location corresponding to an increase in the average background temperature surrounding the test structure. Studies have shown that the average background temperature varies linearly with respect to the input power of the test structure. Since photon shot noise is due to the quantum nature of light there is no way to eliminate it totally using the traditional method and equipment arrangement of the traditional FMI due to the shallow charge wells of CCD arrays in slow-scan cameras which saturate quickly.

There is an existing need to improve the traditional FMI process, as currently performed, by increasing its speed, by decreasing its cost, by simplifying its equipment needs with a minimum of standard and durable equipment, by reducing film degradation, due to bleaching of the fluorescent films, and by enhancing the signal-to-noise ratio attained in its performance thus leading to improved thermal resolution.

SUMMARY OF THE INVENTION
(DISCLOSURE OF THE INVENTION)

The present invention is of an apparatus and method for performing fluorescent microthermal imaging procedures on a substrate positioned in thermal contact with a fluorescent material, comprising: providing photon excitation to the fluorescent material, thereby causing the material to fluoresce in a manner responsive to temperature variations of the substrate; collecting data by imaging the fluorescence in the form of single pixels; and translating the single pixel image data into a thermal image of the temperature variations on a portion of a surface of the substrate. In the preferred embodiment, the substrate is an integrated circuit with a thin film disposed over the surface thereof. The fluorescent material is preferably a rare earth chelate, such as a member of the europium group, most preferably europium thenoyltrifluoroacetonate (EuTTA). The excitation is done by a light source for providing a scanned and focused beam to excite the fluorescent material, preferably a laser, most preferably a scanning laser source. The wavelength is preferably from the visible spectrum (>400 nm) or the ultraviolet (<400 nm) spectrum, such as an helium-cadmium (HeCd) laser with a wavelength of about 442 nm. The data collecting is best done by single point detector, preferably optically coupled with the excitation device. The pixels are translated into a thermal image of the temperature variations in the substrate by computer imaging.

The present invention is also of an apparatus for performing fluorescent microthermal imaging procedures on a microelectronic device (e.g., an IC) positioned in thermal contact with a fluorescent EuTTA thin film, comprising: a laser scanning source for providing a scanned and focused beam of light energy to the EuTTA thin film, thereby causing the EuTTA thin film to fluoresce with an intensity or yield of fluorescence that is responsive to any temperature variations of the device; a scanning laser microscope (SLM) optically coupled with a single point detector for collecting fluorescence data one pixel at a time; and a computer imager for translating the single pixels into a thermal image of the temperature variations in the microelectronic device.

The invention is further of a method of performing fluorescent microthermal imaging procedures on a substrate positioned in thermal contact with a fluorescent rare earth chelate, comprising: exciting the fluorescent material with a scanned and focused beam of light from a laser source, thereby causing the material to fluoresce with an intensity or yield of fluorescence that is responsive to any temperature variations of the substrate; collecting data by imaging the fluorescence in the form of single pixels; and translating the single pixel image data into a thermal image of the temperature variations in the substrate. In the preferred embodiment, exciting the fluorescent material is done with a scanned and focused beam of light from a laser source, and collecting fluorescence data is done by a scanning laser microscope optically coupled with a single point detector. The preferred embodiment also includes raster scanning the focused beam across a predetermined portion of the fluorescent material, localizing the focused laser beam at a predetermined point on the fluorescent material, and varying the dwell time of the focused beam on the fluorescent material to achieve a predetermined signal-to-noise ratio.

In view of the above-described needs, it is a primary object of the present invention to provide a FMI technique that overcomes the above-noted disadvantages of other known FMI methods and that still meets the thermal-analysis needs for imaging of sub-micron integrated circuits.

It is another object of the present invention is to provide an FMI technique that improves signal to noise ratio leading to improved thermal resolution and reduces film degradation due to bleaching of the thin film of fluorescent material.

Another object of the present invention is to provide a new FMI method of testing that is reliable, simple, fast, and inexpensive, that requires a minimum amount of durable equipment and that relaxes requirements on the equipment for data collection.

The limitations associated with existing FMI methods are overcome by the present invention which provides a method and apparatus for analyzing integrated circuits and providing a thermal mapping thereof by use of a scanned and focused beam from a laser to excite a thin fluorescent film disposed over the surface of the integrated circuit (IC) being tested. By collecting fluorescent emission from the film, a thermal map of the IC can be formed to measure localized heating associated with any defects in the IC, such as due to excessive current flow.

In contrast to the known methods of laser fluorescence analysis of ICs which used UV (<400 nm) laser beams to flood the entire IC, the present invention uses visible light (i.e. electromagnetic radiation at a wavelength>400 nm) or UV light (<400 nm), and raster scanning of a focused laser beam across a portion of the surface of the IC (or localizing the focused beam at a particular point on the surface of the IC) to analyze failures in the IC. More specifically, in the present invention, a laser (e.g. a HeCd laser operating at about 442 nm) stimulates fluorescence from the IC being scanned through the optics of a scanning laser microscope (SLM) to obtain a point-by-point data collection using a detector standard to the SLM.

Advantages of the present invention which are based on these technical improvements include improved signal-to-noise ratio due to improved photon statistics and reduced film degradation due to reduced exposure time.

Advantages of the invention also include increased speed of thermal imaging and reduced implementation cost on scanning laser microscopes due to the use of simpler and more efficient equipment for the FMI procedure. In the present invention, a simple single-point detector (standard equipment for a scanning laser microscope) can be used instead of an expensive slow-scan CCD camera. The present invention requires a simple add-on to the scanning laser microscope such that the cost of implementing FMI in scanning laser microscope is much lower than the conventional flood-beam method. In short, scanning FMI using the method and apparatus of the present invention offers better overall performance at substantially less cost than the flood-beam technique.

Other objects, advantages and novel features, and further scope of applicability of the present invention will be set forth in part in the detailed description to follow, taken in conjunction with the accompanying drawing, and in part will become apparent to those skilled in the art upon examination of the following, or may be learned by practice of the invention. The objects and advantages of the invention may be realized and attained by means of the instrumentalities and combinations particularly pointed out in the appended claims. The objects and advantages of the invention may be realized and attained by means of the instrumentalities and combinations particularly pointed out in the appended claims.

BRIEF DESCRIPTION OF THE DRAWINGS

The accompanying drawing, which is incorporated into and forms a part of the specification, illustrates several embodiments of the present invention and, together with the description, serves to explain the principles of the invention. The drawing is only for the purpose of illustrating a preferred embodiment of the invention and is not to be construed as limiting the invention. In the drawing.

Figure 1:
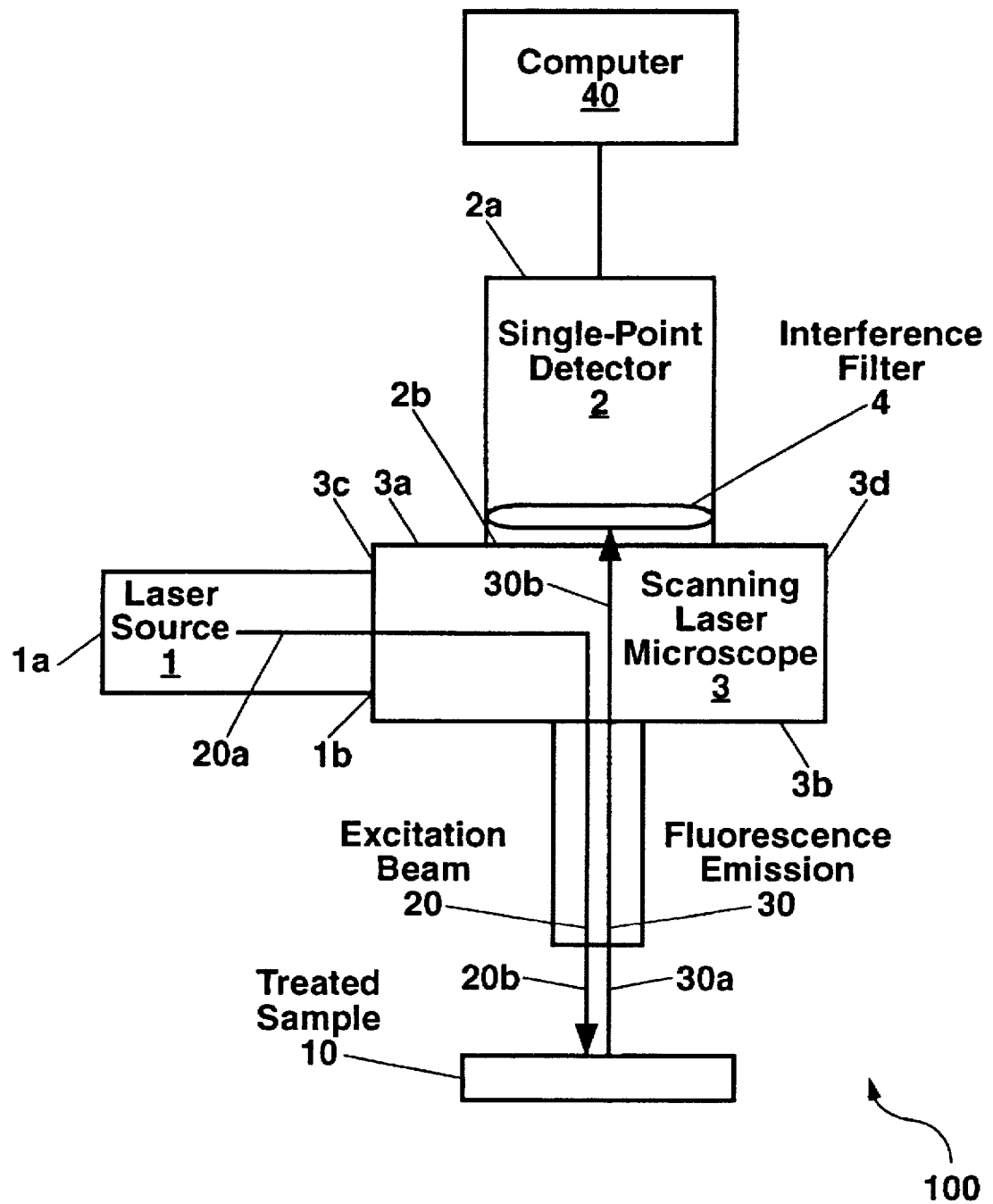
FIG. 1 is a schematic drawing of the inventive optical system for providing scanning FMI showing the laser source, fluorescence detector and scanning laser microscope with which coincident illumination is provided to a treated sample.

DESCRIPTION OF THE PREFERRED EMBODIMENTS (BEST MODES FOR CARRYING OUT THE INVENTION)

In contrast to existing FMI methods, the present invention uses a scanning excitation source, instead of a flood-beam source, Hg arc lamp, or pulsed dye laser used in previously known FMI techniques, and a point-by-point data collection scheme obtained with a single-point fluorescence detector, instead of the slow-scan CCD camera used in previously known FMI techniques.

FIG. 1 is a schematic view of an embodiment of the apparatus 100 for the scanning FMI system of the invention, comprising a scanning laser excitation source 1, having a first end 1a and a second end 1b, photodetector 2 (fluorescence detector), having a top surface 2a and a base 2b, and scanning laser microscope 3, having a top surface 3a, a base 3b, and, as shown schematically, a first end 3c and a second end 3d. Laser source 1 is laterally attached, at its second end 1b, to microscope 3, at its first end 3c, for providing coincident illumination through microscope 3 to treated sample 10 (e.g. an integrated circuit having a thin film of fluorescent material formed thereon). Camera 2 is disposed above microscope 3, and attached at its base 2b to the top surface 3a of microscope 3. Interference filter 4 is positioned at the base 2b of camera 2 between camera 2 and the top surface 3a of microscope 3.

As shown, excitation, depicted as 20a of line or beam 20, originates in the laser source 1 and passes through microscope 3 to provide coincident illumination 20b impinging on treated sample 10. In operation, upon contact with illumination 20b and excitation thereby, treated sample 10 gives off fluorescence emission, depicted as 30a of line 30, which passes through microscope 3, shown as line 30, to be collected as point-by-point data, shown as 30b, by photodetector 2. Interference filter 4 acts to filter out any scattered or reflected portion arising from beam 20 while transmitting fluorescence emission 30a to photodetector 2.

Preferably, laser source 1 is a scanning laser source using visible wavelengths (>400 nm) for excitation, although, according to the method of the invention, both UV and visible lasers can be used in this configuration for scanning FMI. According to the preferred method of the invention, laser source 1 may be a longer-wavelength excitation source than has previously been thought to be feasible for FMI, e.g., a 442 nm He-Cd laser system. More specifically, in the preferred system of the present invention, a 15 mW HeCd laser system is preferably used because it is a small CW laser system that is comparatively inexpensive.

Preferably, photodetector 2 is a single-point photodetector. Preferably, microscope 3 is a scanning laser microscope (SLM) for implementation of the scanning laser source 1. The scanning excitation provided by laser source 1 and the point-by-point data collection provided by photodetector 2 are made possible with the use of a standard, commercially available SLM system. The use of a standard, commercially available SLM system makes the method of the present invention more commercially viable and capable of being implemented with a minimal capital investment. As in the traditional FMI systems, a computer 40 processes the scanned FMI thermal images.

In operation, the scanning FMI method of the preferred embodiment still relies on the substrate surface being treated with the same temperature-dependent fluorescent EuTTA film as used for traditional FMI, but the illumination is provided by a scanning laser source (e.g. a HeCd laser operating at about 442 nm wavelength). Because of the fluorescent film's absorption characteristics, visible wavelengths have previously been thought to be too long to generate sufficient fluorescence intensity for FMI. The EuTTA film's absorption efficiency at visible wavelengths drops off by several orders of magnitude from its value at the traditionally used UV wavelengths and the traditional use of flood illumination further reduces the fluorescence yield by spreading the excitation light over a substantial area. However, using the preferred system of the present invention with a focused laser beam, the efficiency is sufficient to make high-resolution thermal images for FMI. More specifically, despite the fact that the molar excitation coefficient of the fluorescent EuTTA-based film at visible wavelengths (442 nm from an He-Cd laser) is approximately four to five orders of magnitude smaller than that at UV wavelengths (<365 nm), sufficient fluorescence for microthermal imaging can be excited from EuTrA-based films with these visible wavelengths, contrary to conventional belief that sufficient fluorescence can only be excited with a UV source. This means that the 442 nm laser light source, while approximately five orders of magnitude less efficient for pumping the EuTTA's fluorescence, is sufficient for FMI using the configuration of the present invention, i.e., enough fluorescence is yielded from the substrate surface to create FMI images. Also, the fight source is far enough away from the europium excitation wavelengths (465 nm and 525 nm) that it will not bypass the EuTTA ion's intermolecular energy transfer process. Thus, the system of the present invention provides true FMI-type thermal images of IC's.

The data collection method of the present invention involves point-by-point data collection with a single-point photodetector (i.e., a point detector which collects data one pixel at a time) instead of the previously used CCD-based camera that collects data in parallel. The use of the scanning laser microscope allows the point-by-point data collection to be performed.

Scanning FMI offers a variety of practical and technical improvements over the traditional FMI technique. First, practically, the present invention's capability for point-by-point data collection relaxes the requirements on the equipment needed for data collection, so that with the present invention, FMI can be implemented relatively easily and inexpensively using a scanning laser microscope with the addition of a UV or visible laser and an interference filter to filter out any scattered laser light while transmitting a single fluorescent line.

The single-point detector eliminates a need for an expensive CCD camera. Also, technically, single-point detectors can collect orders of magnitude more photons than CCD arrays due to a much higher saturation threshold. Higher photon collection leads to better photon statistics and a reduction in photon shot noise. Since photon shot noise dominates all other types of noises in FMI, its reduction significantly improves signal-to-noise ratio and thermal resolution of FMI images. Further, FMI with the method and apparatus of the present invention is considerably more versatile than previously: dwell time (exposure or time spent on each pixel) can be predetermined or varied to achieve the desired signal-to-noise ratio; and raster scanning (scanning in a predetermined pattern) of the focused laser beam across a portion of the surface of the IC, or localizing the focused beam at a particular point on the surface of the IC, are both possible.

Also, with the present invention, the intensity of the focused scanning beam is much stronger than that in the flood-beam illumination, resulting in a much shorter dwell time at given location on the sample. Since the fluorescent EuTTA-based films degrade (bleach) during exposure to UV sources, and the bleaching causes the generation of non-thermal signals or spatial artifacts which dramatically affect the thermal quality of FMI images, reducing the exposure time (i.e. dwell time) in the scanning FMI technique reduces the bleaching, thereby minimizing the negative effect of bleaching on the thermal images.

Finally, the present invention allows for fluorescent lifetime measurements (using a pulsed laser excitation source) and is not limited to fluorescence quantum yield measurement, as were the previously known FMI methods, thus increasing the potential usefulness of FMI.

A preferred use for the method and apparatus of the invention is in all areas involving testing of microelectronic devices. The present invention can be applied by all manufacturers and users of microelectronic devices. Manufacturers are interested in yield and reliability-limiting problems as well as in diagnosing problems with customer field returns. Also, users have a need to understand and compare failures from different component suppliers. There is a significant market for technologies which can accurately and quickly diagnose failures in microelectronic devices.

A particularly preferred use is in failure analysis of sub-micron IC and flip-chip packaging technologies because of multiple metal layers, low power dissipation, and small feature sizes. FMI, performed with the method and apparatus of the present invention, offers a unique combination of spatial resolution (~0.3 μm), temperature resolution (~1 m° C.) and ease of use, and is ideally suited to the failure analysis of modern ICs, particularly in localizing "hot spot" defects.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. An apparatus for performing fluorescent microthermal imaging procedures on a substrate positioned in thermal contact with a fluorescent material, comprising:
   (a) means for providing excitation to the fluorescent material, thereby causing the material to fluoresce in response to temperature variations in the substrate;
   (b) means for collecting data from the fluorescence a single pixel at a time; and
   (c) means for translating a plurality of single pixels of data into a thermal image of the temperature variations in the substrate.

2. The apparatus of claim 1 wherein the substrate is an integrated circuit.

3. The apparatus of claim 2 wherein the fluorescent material is a thin film disposed over a surface of the integrated circuit.

4. The apparatus of claim 1 wherein the fluorescent material comprises at least one member selected from the group consisting of rare earth chelates.

5. The apparatus of claim 4 wherein the fluorescent material comprises at least one member selected from the europium group.

6. The apparatus of claim 5 wherein the fluorescent material comprises europium thenoyltrifluoroacetonate (EuTTA).

7. The apparatus of claim 1 wherein the means for providing excitation to the fluorescent material comprises a light source for providing a scanned and focused beam to excite the fluorescent material.

8. The apparatus of claim 7 wherein the light source comprises a laser.

9. The apparatus of claim 8 wherein the laser comprises a scanning laser source.

10. The apparatus of claim 8 wherein the laser provides excitation at a visible wavelength greater than about 400 nanometers.

11. The apparatus of claim 10 wherein the laser comprises a helium-cadmium laser.

12. The apparatus of claim 11 wherein the wavelength of the helium-cadmium laser is about 442 nanometers.

13. The apparatus of claim 8 wherein the laser provides excitation at an ultraviolet wavelength less than about 400 nanometers.

14. The apparatus of claim 1 wherein the means for providing excitation to the fluorescent material is a scanning laser source, optically coupled with a scanning laser microscope, for providing a scanned and focused beam to excite the fluorescent material.

15. The apparatus of claim 1 wherein the means for collecting fluorescence data in the form of single pixels is a single-point detector.

16. The apparatus of claim 15 wherein the single-point detector is optically coupled with the means for providing excitation to the fluorescent material.

17. The apparatus of claim 1 wherein the means for translating the single pixels into a thermal image of the temperature variations in the substrate is a computer imaging means.

18. An apparatus for performing fluorescent microthermal imaging procedures on a microelectronic device positioned in thermal contact with a fluorescent EuTTA thin film, comprising:
   (a) a laser scanning source for providing a scanned and focused beam of excitation energy to the EuTTA thin film, thereby causing the EuTTA thin film to fluoresce responsive to any temperature variations of the device.
   (b) a scanning laser microscope optically coupled with a single-point detector for collecting fluorescence emission dam one pixel at a time; and
   (c) a computer imaging means for translating the fluorescence emission data from each pixel into a composite thermal image of the microelectronic device showing any temperature variations therein.

19. The apparatus of claim 18 wherein the laser source provides a beam of excitation energy at a visible wavelength greater than about 400 nanometers.

20. The apparatus of claim 19 wherein the laser source is a helium-cadmium laser and the wavelength is about 442 nanometers.

21. The apparatus of claim 18 wherein the laser source provides a beam of excitation energy at an ultraviolet wavelength of less than about 400 nanometers.

22. A method of performing fluorescent microthermal imaging procedures on a substrate positioned in thermal contact with a fluorescent material comprised of at least one member from the group consisting of rare earth chelates, the method comprising the steps of:
   (a) exciting the fluorescent material with a scanned and focused beam of excitation energy, thereby causing the material to fluoresce responsive to any temperature variations of the substrate;
   (b) collecting the fluorescence in the form of single pixels of data collected one pixel at a time; and
   (c) translating the single pixel data into a thermal image of the substrate for providing an indication of any temperature variations in the substrate.

23. The process of claim 22 wherein the exciting step comprises exciting the fluorescent material with a scanned and focused beam of excitation energy from a laser source, and the collecting step comprises collecting fluorescence data by a scanning laser microscope optically coupled with a single-point detector.

24. The process of claim 23 wherein the excitation energy is at a visible wavelength greater than about 400 nanometers.

25. The process of claim 23 wherein the excitation energy is at an ultraviolet wavelength less than about 400 nanometers.

26. The process of claim 23 further comprising the step of raster scanning the focused laser beam across a predetermined portion of the fluorescent material.

27. The process of claim 26 further comprising the step of localizing the focused laser beam at a predetermined point on the fluorescent material.

28. The process of claim 22 further comprising the step of varying a dwell time of the focused beam on the fluorescent material to achieve a predetermined signal-to-noise ratio.

29. The process of claim 22 wherein the step of collecting the fluorescence includes measuring a fluorescence quantum yield or a fluorescence lifetime.

* * * * *